US012385468B2

(12) United States Patent
Messing et al.

(10) Patent No.: US 12,385,468 B2
(45) Date of Patent: Aug. 12, 2025

(54) METHOD FOR OPERATING A WIND FARM AND WIND FARM

(71) Applicant: Wobben Properties GmbH, Aurich (DE)

(72) Inventors: Ralf Messing, Aurich (DE); Kai Busker, Großefehn (DE)

(73) Assignee: Wobben Properties GmbH, Aurich (DE)

( * ) Notice: Subject to any disclaimer, the term of this patent is extended or adjusted under 35 U.S.C. 154(b) by 442 days.

(21) Appl. No.: 17/719,950

(22) Filed: Apr. 13, 2022

(65) Prior Publication Data

US 2022/0325694 A1 Oct. 13, 2022

(30) Foreign Application Priority Data

Apr. 13, 2021 (EP) ..................................... 21168088

(51) Int. Cl.
*F03D 7/02* (2006.01)
*F03D 7/04* (2006.01)

(52) U.S. Cl.
CPC ........... *F03D 7/028* (2013.01); *F03D 7/0224* (2013.01); *F03D 7/048* (2013.01); *F05B 2270/1033* (2013.01); *F05B 2270/327* (2013.01); *F05B 2270/328* (2013.01); *F05B 2270/335* (2013.01); *G05B 2219/2619* (2013.01)

(58) Field of Classification Search
CPC ........ F03D 7/028; F03D 7/0224; F03D 7/048; F03D 7/0284; F05B 2270/1033; F05B 2270/327; F05B 2270/328; F05B 2270/335; F05B 2270/337; G05B 2219/2619
See application file for complete search history.

(56) References Cited

U.S. PATENT DOCUMENTS

| 8,853,877 | B1 * | 10/2014 | Zalar ...................... F03D 7/028 290/44 |
| 9,018,782 | B2 | 4/2015 | Couchman et al. |
| 11,125,215 | B2 * | 9/2021 | Enevoldsen ............ F03D 17/00 |
| 2011/0301769 | A1 | 12/2011 | Lovmand et al. |

(Continued)

FOREIGN PATENT DOCUMENTS

| EP | 2 235 367 | 10/2010 |
| WO | 2009/082204 A1 | 7/2009 |
| WO | 2014/026688 A1 | 2/2014 |

*Primary Examiner* — Chad G Erdman
(74) *Attorney, Agent, or Firm* — Seed IP Law Group LLP

(57) ABSTRACT

A method for operating a wind farm having a plurality of wind power installations is provided. The installations each comprise an aerodynamic rotor, and the rotors each have an aerodynamic characteristic value. The method includes: obtaining a setpoint power value of the wind farm, in particular a setpoint value of the electrical power of the wind farm to be fed in, ascertaining an actual power value of the wind farm as the sum of actual electrical powers of the operated wind power installations, determining a permissibility of a power-reduced operating mode of each of the wind power installations of the wind farm on the basis of the associated aerodynamic characteristic value, and operating the wind power installations of the wind farm such that each operated wind power installation is operated in a permissible operating mode and the ascertained actual power value does not exceed the obtained setpoint power value.

17 Claims, 3 Drawing Sheets

(56) References Cited

U.S. PATENT DOCUMENTS

2016/0131108 A1\* 5/2016 Shimura ............... F03D 1/0675
  137/803
2019/0345915 A1\* 11/2019 Picard ................... F03D 7/0292
2022/0356868 A1\* 11/2022 Tanaka ...................... F03D 7/04
2023/0151798 A1\* 5/2023 Dunne .................... F03D 7/043
  416/1

\* cited by examiner

METHOD FOR OPERATING A WIND FARM AND WIND FARM

BACKGROUND

Technical Field

The present invention relates to a method for operating a wind farm having at least two wind power installations and to an associated wind farm.

Description of the Related Art

Wind power installations for generating electric current from wind are known. Modern wind power installations typically contain an aerodynamic rotor with a horizontal axis on which at least one rotor blade, which is able to rotate about its longitudinal axis, is arranged.

A plurality of wind power installations can be connected in a wind farm to a common network infeed point for feeding electrical energy into an electrical supply network. In this case, provision may be made of a farm controller of the wind farm, which influences the operation of the individual wind power installations and ultimately coordinates the infeed of the wind farm into the electrical supply network.

Demands can be placed on the infed electrical power by the operator of the electrical supply network. A wind farm must meet these network-based demands in order to meet current standards, for example. This includes, in particular, a demand for a maximum generated electrical power of the wind farm, which, for example, may not exceed a threshold value provided by the supply network, referred to as setpoint power value.

If, for example, the provided threshold value is below a nominal power of the wind farm and the prevailing wind conditions permit an operation of the wind power installations above the provided threshold value, the farm controller must intervene in order that the wind power installations do not generate electrical power through operation in a power-optimized operating mode, said power exceeding the provided threshold value.

BRIEF SUMMARY

Against this background, a method for operating a wind farm and a corresponding wind farm that enables standard-compliant operation as effectively as possible are provided.

In one aspect, a method for operating a wind farm having at least two wind power installations is proposed, wherein the wind power installations each comprise an aerodynamic rotor, wherein the rotors each have an aerodynamic characteristic value, and wherein the method comprises the following steps: i) obtaining a setpoint power value of the wind farm, in particular a setpoint value of the electrical power of the wind farm that is to be fed in, ii) ascertaining an actual power value of the wind farm as the sum of actual electrical powers of the operated wind power installations. The method also comprises: iii) determining a permissibility of a power-reduced operating mode of each of the wind power installations of the wind farm based on the associated aerodynamic characteristic value, and iv) operating the wind power installations of the wind farm in such a way that each of the operated wind power installations is operated in a permissible operating mode and the ascertained actual power value does not exceed the obtained setpoint power value.

The setpoint power value can be provided, for example, by a network operator and may be a maximum value of the electrical power to be fed into a power supply network by the wind farm. It is known that, in response to such a setpoint power value, a wind farm ensures that the infed electrical power does not exceed said setpoint power value.

The term "setpoint value" is thus to be understood here as a maximum value that is reached given a sufficient wind. It is thus a requirement that the wind conditions permit the setpoint value to be reached at all. Wind power installations are usually operated in such a way that the maximum electrical energy is generated while taking various boundary conditions into account.

Even if this does not accordingly involve a setpoint value in the conventional control technology sense, the term has established itself in the field of wind power technology for the maximum value of electrical power that is to be fed in.

The setpoint power value may particularly preferably be any value between 0 kilowatt (kW), that is to say no infed power, and a nominal power of the wind farm. Smooth limitation is thus made possible.

The actual power value that is ascertained is, in particular, an instantaneous value, which preferably has a high resolution, particularly preferably describes a period of at most 1 second. In other words, the actual power value is not a power value averaged over a relatively long period but can be referred to as the power value actually fed into the electrical supply network at the network infeed point instantaneously.

For this purpose, the actual power value may be measured at a central infeed point of the wind farm at which the sum of the electrical powers of the individual wind power installations converge. As an alternative or in addition, the individual wind power installations can transmit a respective actual power value to a central farm controller via data communication, the step of ascertaining the actual power value then being carried out on said farm controller by summing the individual transmitted values of the individual wind power installations.

Both methods for determining the actual power value can also particularly preferably be used to detect any deviations between the two determined values and thus identify malfunctions.

The aerodynamic characteristic value is a characteristic value that characterizes at least one aerodynamic property of the rotor blade. The aerodynamic property is particularly advantageously the occurrence of flow separation, in particular flow separation on the pressure side in an external region of the rotor blade, which is also known as negative stall. Other aerodynamic properties of the rotor blade can also be specified by the aerodynamic characteristic value.

The aerodynamic characteristic value is not necessarily constant but preferably depends on environmental and/or operating conditions. It is therefore particularly advantageous to provide the aerodynamic characteristic value in parameterized form. For example, the aerodynamic characteristic value can depend on the wind conditions, in particular a wind speed, a turbulence intensity, a wind shear, etc., and/or on operating conditions of the wind power installation, such as a rotational speed, an oblique incident flow and/or a setting angle of the rotor blades. The oblique incident flow in this case preferably denotes an angle between the rotor axis of the rotor and the wind direction.

The aerodynamic characteristic value thus preferably makes it possible to evaluate a permissibility of a determined operating mode. Wind power installations are conventionally operated in a yield-maximized operating mode, in which for example a rotational speed of the rotor and/or a setting angle or pitch angle of the rotor blades is controlled in such a way that the electrical power generated is maximized. In other operating modes, other boundary conditions are also possible, such as a maximum permissible noise generation, for example. Further operating modes may be power-reduced operating modes, in which the boundary condition for the operation may be a maximum electrical power to be generated. This operation is based, in particular, on demands from an operator of an electrical supply network, wherein other reasons may also cause the need for this operating mode. The electrical power can preferably be restricted smoothly between no power generation and a nominal or maximum power of the wind power installation.

In particular, in some cases, a central farm controller, which, for example, coordinates the operation of the wind farm, can issue instructions to the individual wind power installations for the operation, for example can assign boundary conditions for the operating mode. These boundary conditions may be, for example, the aforementioned power restrictions or else other conditions.

A central farm controller, which, for example, at least partly implements the method according to the disclosure, usually communicates demands with respect to the operation to the individual wind power installations for this purpose. The farm controller does not directly know whether one of the wind power installations can comply with the demands or whether, for example, an excessively high throttling of one of the wind power installations also has undesirable consequences.

By using the aerodynamic characteristic value that is provided for each of the wind power installations, the permissibility of the advised operating mode can now be determined. The determination can be carried out by the wind power insulation itself and the result can be transmitted to the central farm controller, for example. As an alternative or in addition, the farm controller or another central control unit can perform the determination for the individual wind power installations centrally. For this purpose, the required aerodynamic characteristic values can be provided to the central control unit or these may already have been previously stored therein.

The aerodynamic characteristic value is particularly preferably an unchanging value or an unchanging parameterized value that does not or does not substantially change over the lifetime of the wind power installation.

The method also preferably involves determining, on the basis of the obtained setpoint power value, whether a power-reduced operation of at least one of the wind power installations of the wind farm is necessary.

A power-reduced operation is necessary only when the wind power installations also generate a sum of actual electrical powers that exceeds the setpoint power value in a power-optimized operation. This is, in particular, not the case when the wind speed is too low, such that, for example, a full-load operation of the respective wind power installation is not necessary. In the other case, specifically when the sum of the actual electrical powers exceeds the setpoint power value, at least one wind power installation must be operated in a power-reduced operating mode in order that the setpoint power value is not exceeded.

It is known that a demanded power reduction is distributed equally over the individual wind power installations of the wind farm. For example, the central farm controller then demands that all of the wind power installations are instructed to carry out a power reduction by a determined amount of power, for example an absolute amount of power such as 500 kW or a relative amount of power such as 10% of the nominal power, or to a determined amount of power, for example an absolute amount of power of 2 megawatt (MW) or a relative amount of power such as 50% of the nominal power. The numerical values stated are of course to be understood as purely exemplary.

As an alternative, however, an unequal power restriction, that is to say an unequal throttling of the wind power installations, is also conceivable. The difficulty that is solved by the present disclosure is in this case the prioritization and weighting of the power throttling processes of the individual wind power installations of the wind farm.

At least one of the wind power installations of the wind farm is preferably not operated in order for at least one of the remaining wind power installations to be able to be operated in a permissible operating mode.

One finding of the present disclosure is that particularly the severely limited operating modes may be critical for wind power installations, in particular in the case of a relatively strong wind. Due to the usually high negative angle of attack in such operating modes, at a high wind speed specifically in outer blade regions there is the risk of flow separation on the pressure side of the rotor blade, which is also known as negative stall. Negative stall leads to high loads on the rotor blade, for example.

By virtue of at least one of the wind power installations not being operated now, the limitations on the remaining wind power installations may be less severely pronounced without the setpoint power value being exceeded in sum. It can thus be ensured that no wind power installation is operated in an impermissible, for example severely limited, operating mode. In this context, "are not operated" is understood as meaning that the wind power installation is operated in an operating mode in which no electrical power is generated. The installation can thus, for example, be deactivated or be in a coasting mode, wherein other operating modes in which no electrical energy is generated are also conceivable.

The aerodynamic characteristic value is preferably indicative of flow separation, in particular on a pressure side of a rotor blade of the rotor.

By providing the aerodynamic characteristic value, it is thus possible to prevent flow separation by virtue of critical operating modes being characterized as impermissible for current environmental conditions and accordingly preferably not being started up.

The aerodynamic characteristic value preferably comprises a critical pitch angle, wherein the flow separation takes place in particular when the critical pitch angle is exceeded.

The risk of flow separation becomes greater the more the power of a wind power installation has to be throttled. This takes place at a constant power/rotational speed with the blade turning out of the wind, which is referred to as an increase in the pitch angle. An exceeding of the critical pitch angle thus corresponds to the situation in which the rotor blade turns too far out of the wind and consequently flow separation is possible.

By changing the pitch angle, the angle of attack of the rotor blades is changed in order to influence the aerodynamic efficiency of the rotor. In particular, it is known here to restrict the aerodynamic efficiency of the rotor in a full-load operation and also a power-reduced operation in such a way that the desired electrical power at the generator output, for example the nominal power of the generator or the restricted setpoint power, is not exceeded. If the rotor blade is set to be too disadvantageous in terms of aerodynamics by increasing the pitch angle, there is a risk of flow separation on the pressure side. The aerodynamic characteristic value accordingly in this embodiment indicates whether or not the critical pitch angle has been reached.

The aerodynamic characteristic value is preferably ascertained based on a characteristic map.

A characteristic map is distinguished by particularly simple implementation in terms of information technology. Other options for determining the aerodynamic characteristic value on the basis of parameters are of course also possible.

The characteristic map preferably determines the aerodynamic characteristic value as a function of a rotational speed of the wind power installation, a power stage and optionally a degree of soiling of the rotor.

Each of the wind power installations is preferably operated within the permissible area of the characteristic map.

In this case, it is preferred that the entire characteristic map does not have to be permanently evaluated in order to obtain all of the permissible operating modes. If, for example, a power increase or a power stage is specified, the characteristic map can prescribe the permissible operating modes for said power stage. If there is no permissible operating mode for the demanded power stage available, for example because the wind speed is too high or for other reasons, in one embodiment the wind power installation can be operated in another power stage or can be deactivated.

In this embodiment, the aerodynamic characteristic value comprises a critical pitch angle. The pitch angle is particularly preferably compared with the critical pitch angle in order to determine a permissibility of the operating mode. In this case, the operating mode does not have to be set at the wind power installation; it is sufficient if the aerodynamic characteristic value is used in order to determine whether the operation set can expect a pitch angle that is outside of the permissible range, in particular above the critical pitch angle.

For greater shear values, the pitch angle set can be averaged over the rotor azimuth in order to obtain an average pitch angle. Possible individual rotor adjustments, in which the pitch angle of individual rotor blades is set partly or completely independently of one another, can thus also be reduced and easily evaluated by means of the aerodynamic characteristic value.

The operating mode is preferably selected from the permissible operating modes of the individual installations on the basis of at least one of the following criteria; a) tariff; b) load; c) sound.

In this embodiment, a plurality of operating modes from the available operating modes of the wind power insulation are therefore permissible. It is necessary to decide which of the permissible operating modes of the wind power installation is selected for the operation. The selection can be made either by the wind power installation itself or by a central control unit, for example the farm controller or a server.

A tariff of the electrical power generated by the wind power installation, loads acting on the wind power installation and/or sound emissions generated by the wind power installation are suitable for the criteria for the selection of the operating mode from the permissible operating modes. Accordingly, conditions are proposed from which the operating mode is ultimately selected under the further additional condition of the total power of the wind power installations, which does not exceed the setpoint power value, and the permissibility of the respective operating modes.

It may be the case that different monetary balancing payments for the energy generated are made for different wind power installations of the wind farm, which payments are referred to as infeed tariff. It is preferred that those wind power installations that obtain a higher infeed tariff are limited to a lesser extent than those installations for which a lower infeed tariff is paid.

In addition, in one embodiment it may be desirable that those wind power installations that are located closer to inhabited developments are operated in such a way that they cause lower sound emissions. While more severe limitation is typically associated with lower sound emission, this may be the reverse particularly in the case of very severe limitation. The operation of all of the wind power installations under the additional condition of the lowest possible sound emission at relevant locations is therefore particularly preferably optimized.

Finally, it may be preferred that remaining loads or lifetimes are taken into account in the selection of the operating mode. Both variants that result either in an extension of the remaining lifetime or a shortening of the remaining lifetime are thus conceivable. The remaining lifetimes of the wind power installations of the wind farms are particularly preferably matched to one another so that a renewal of the entire wind farm coincides as far as possible with the end of the lifetime of all of the wind power installations. As an alternative, however, the wind power installations may also be renewed successively, wherein in this case it is preferred that the wind power installations reach their respective end of lifetime not at the same time but in staggered fashion.

The aerodynamic characteristic value is preferably determined individually for each of the wind power installations.

Therefore, in a case in which a plurality of wind power installations, for example of different types or made by different manufacturers, are operated in a common wind farm, optimized operation of the wind farm and at the same time each of the individual wind power installations is possible.

The determination of a permissibility of a power-reduced operating mode of each of the wind power installations preferably includes a determination of a setpoint rotational speed of the aerodynamic rotor and the aerodynamic characteristic value is taken into account in the determination of the setpoint rotational speed of the aerodynamic rotor.

The operation of the wind power installation in the power-reduced operating mode preferably includes a reduction of the setpoint rotational speed in a first operating range and an increase of the setpoint rotational speed in a second operating range.

The operation of the wind power installation in the power-reduced operating mode preferably includes a change, in particular an increase, in a pitch angle of the rotor.

The aerodynamic rotor is preferably coupled to an electrical generator and the operation of the wind power installation in the power-reduced operating mode involves a change, in particular a reduction, in a generator torque of the electrical generator.

The power, in particular the electrical active power at the generator output, of the wind power installation in the power-reduced operating mode is preferably reduced to a predetermined power value and/or by a predetermined absolute power value.

At least one of the aerodynamic characteristic values is preferably taken into account in the determination of at least one setpoint rotational speed of one of the aerodynamic rotors.

A wind farm having at least two wind power installations and a wind farm control system is also provided, wherein the wind farm control system is designed to carry out the method described herein.

The wind farm according to this aspect enables the same advantages as the method described above and is likewise advantageously able to be combined with all of the preferred configurations.

BRIEF DESCRIPTION OF THE SEVERAL VIEWS OF THE DRAWINGS

Further advantages and particular configurations are described below with reference to the appended figures. In the figures.

DETAILED DESCRIPTION

Figure 1:
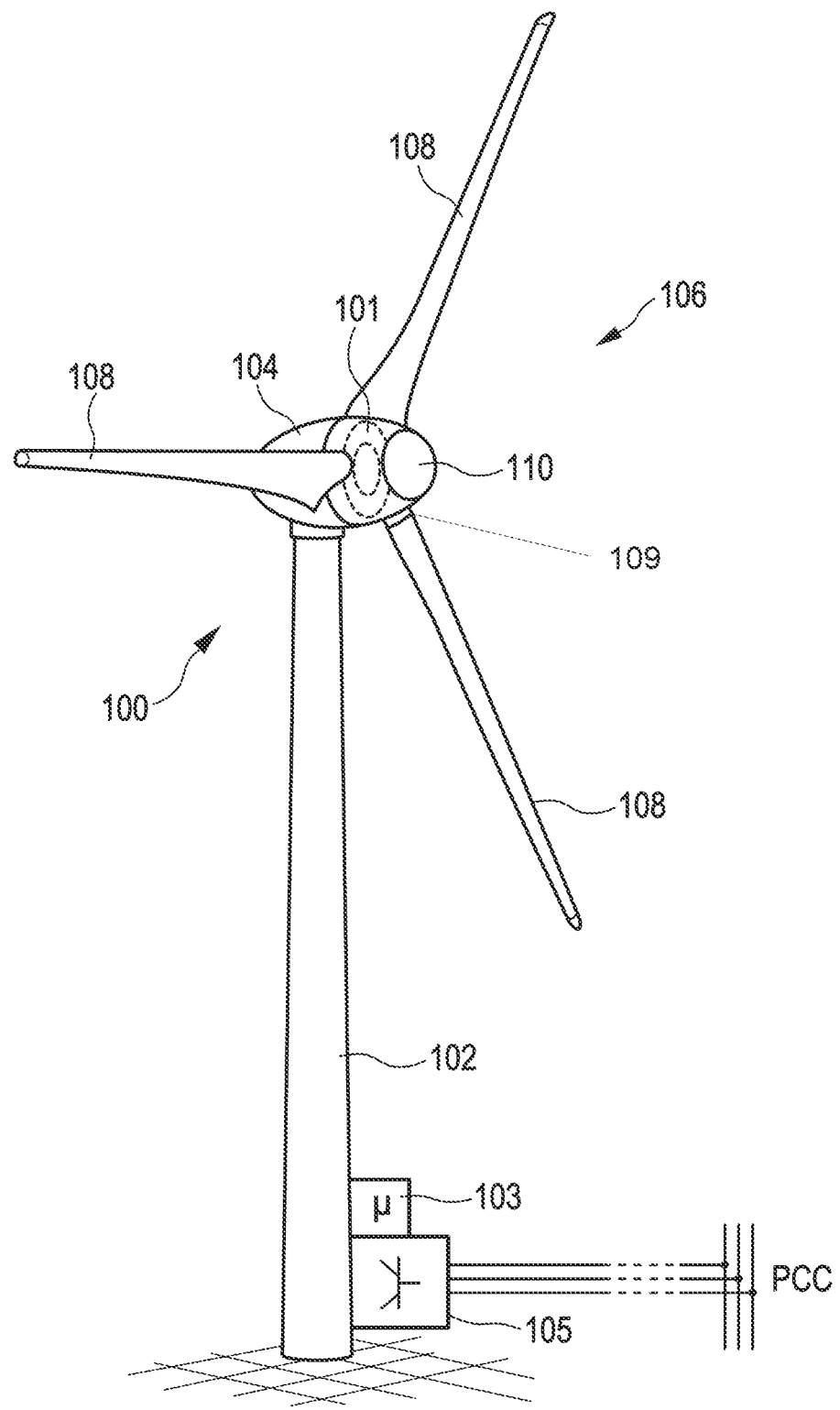
FIG. 1 schematically shows a wind power installation by way of example.

FIG. 1 shows a schematic illustration of a wind power installation. The wind power installation 100 has a tower 102 and a nacelle 104 on the tower 102. An aerodynamic rotor 106 having three rotor blades 108 and having a spinner 110 is provided on the nacelle 104. During the operation of the wind power installation, the aerodynamic rotor 106 is set in rotational motion by the wind and thereby also rotates an electrodynamic rotor of a generator 101, which is coupled directly or indirectly to the aerodynamic rotor 106. The electric generator is arranged in the nacelle 104 and generates electrical energy. The pitch angles of the rotor blades 108 may be varied by pitch motors at the rotor blade roots 109 of the respective rotor blades 108.

The wind power installation 100 in this case has an electric generator 101, which is indicated in the nacelle 104. Electric power is able to be generated by way of the generator 101. Provision is made for an infeed unit 105, which may be designed in particular as an inverter, to feed in electric power. It is thus possible to generate a three-phase infeed current and/or a three-phase infeed voltage in terms of amplitude, frequency and phase, for infeed at a grid connection point PCC. This may be performed directly or else together with other wind power installations in a wind farm. Provision is made for an installation control system 103 for the purpose of controlling the wind power installation 100 and also the infeed unit 105. The installation control system 103 may also receive predefined values from an external source, in particular from a central farm computer.

Figure 2:
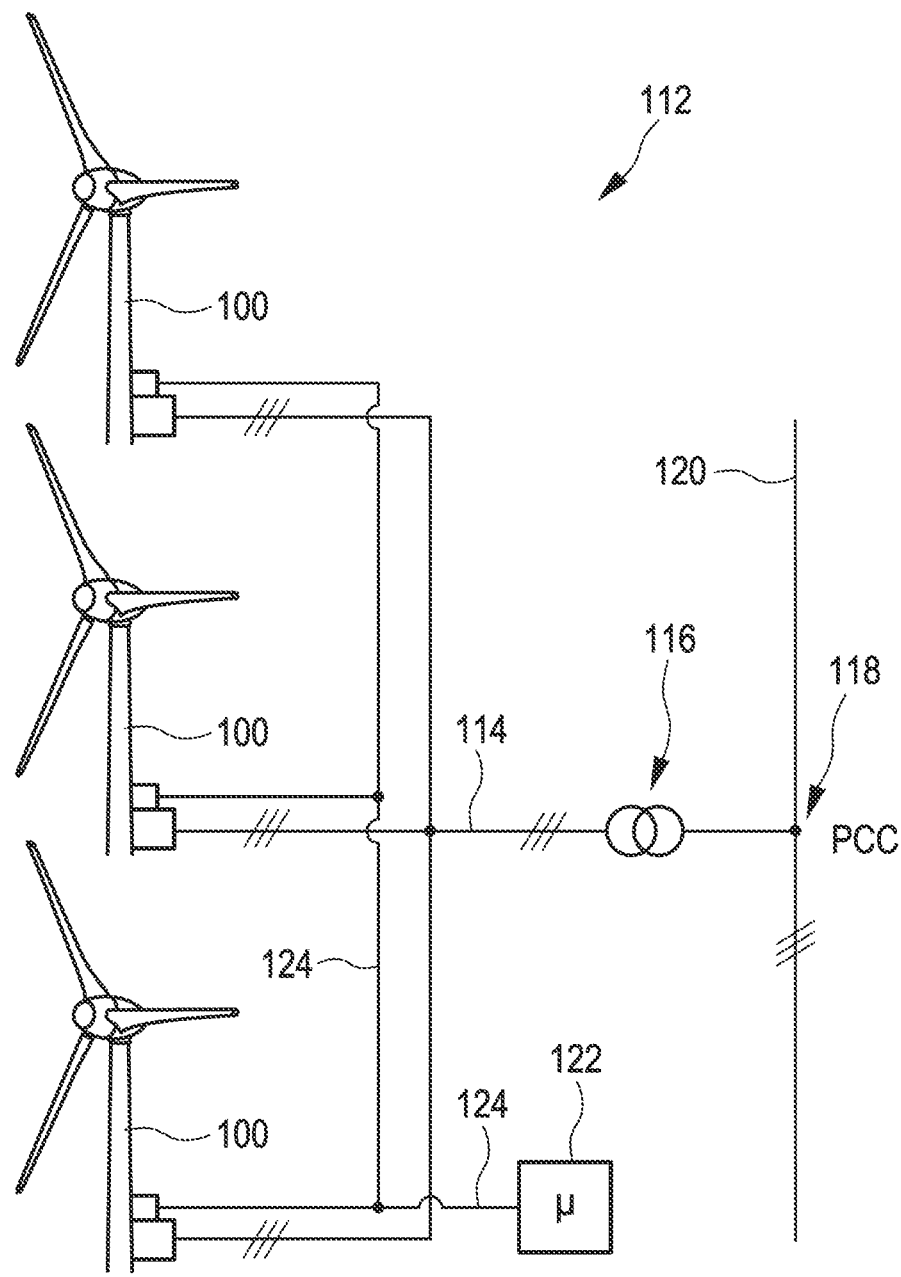
FIG. 2 schematically shows a wind farm by way of example.

FIG. 2 shows a wind farm 112 having, by way of example, three wind power installations 100, which may be identical or different. The three wind power installations 100 are thus representative of basically any desired number of wind power installations of a wind farm 112. The wind power installations 100 provide their power, specifically in particular the generated current, via an electrical farm network 114. In this case, the respectively generated currents or powers of the individual wind power installations 100 are added together and a transformer 116, which steps up the voltage in the farm, is usually provided in order to then feed into the supply network 120 at the infeed point 118, which is also generally referred to as a point of common coupling (PCC). FIG. 2 is only a simplified illustration of a wind farm 112. By way of example, the farm network 114 may also be designed in another way by virtue of for example a transformer also being present at the output of each wind power installation 100, to mention just one other exemplary embodiment.

The wind farm 112 additionally has a central farm computer 122, which can also be referred to synonymously as central farm control system. This may be connected, via data lines 124 or wirelessly, to the wind power installations 100 in order to exchange data with the wind power installations via this connection and, in particular, to receive measured values from the wind power installations 100 and transmit control values to the wind power installations 100.

In this case, the central farm controller 122 is to be understood functionally as the component that is designed to execute the central farm control. The central farm controller 122 and/or individual components thereof can also be provided in a physically remote manner, for example in a server or in a cloud.

Figure 3:
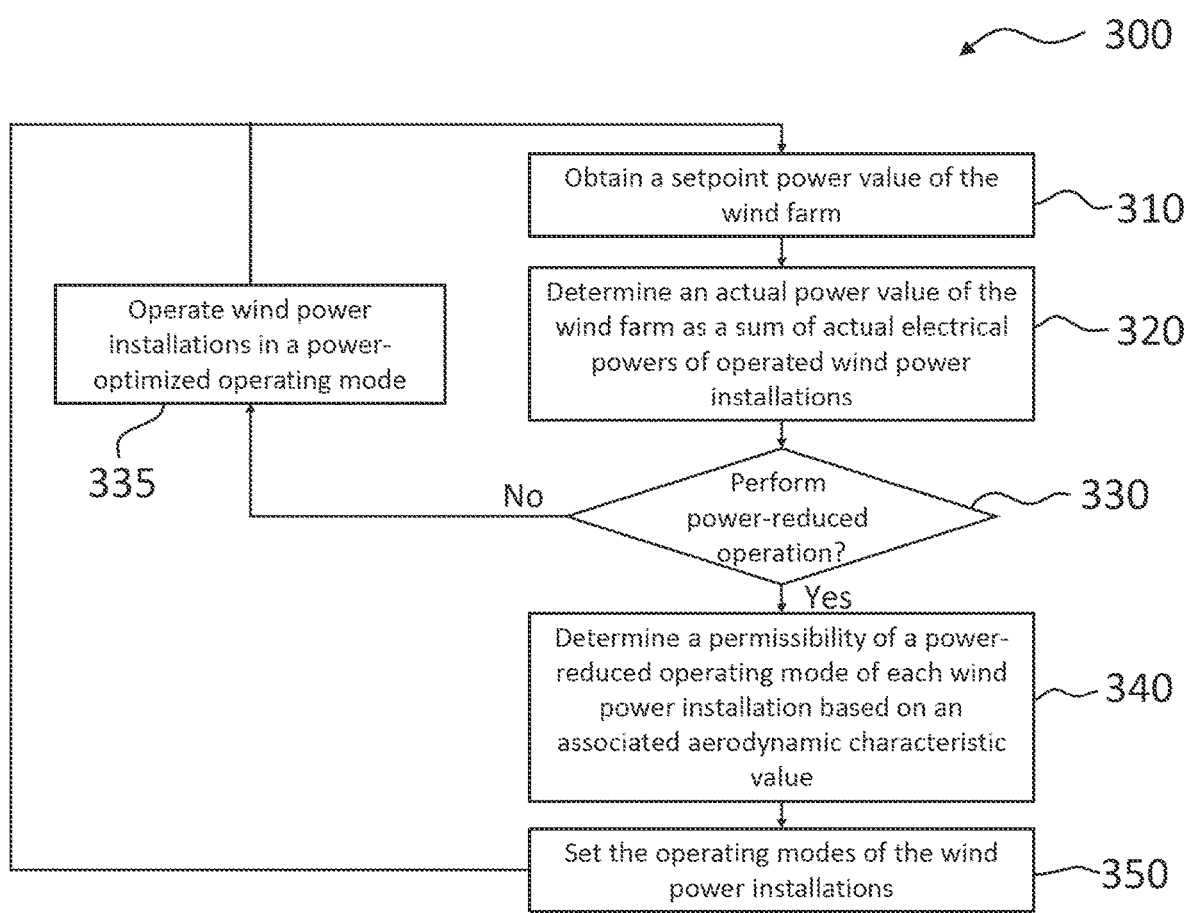
FIG. 3 schematically shows a flowchart of a method by way of example.

FIG. 3 schematically shows by way of example a flowchart of a method 300 for operating a wind farm 112, as is executed, for example, fully or partly on the central farm controller 122 and/or the individual wind power installations 100 of the wind farm 112. The dividing of the execution of the method steps between the central farm controller 122 and the individual wind power installations 100 may be different depending on the implementation.

An operator of a wind farm 112 guarantees a preferably smooth power limitation between 0-100% at the infeed point 118 or network connection point PCC. In this case, it is known to transmit the same active power control value from the farm controller 122 to all of the wind power installations 100 of the wind farm 112. The method 300 enables individual installation control by way of an operation of the individual wind power installations 100 with individual active power control values, wherein each wind power installation 100 can be supplied with different power limitations. In this case, the central farm controller 122 can either provide an active power control value to the wind power installations 100 directly or can provide or communicate an operating mode to be adjusted by the wind power installations 100 in another manner.

The power limitation can be carried out conventionally with a reduced rotational speed on the power-optimum operating characteristic curve, wherein other types of power limitation are also known.

The method 300 now makes it possible for the effects of the power limitation on the rotor blade aerodynamics to be taken into account and thus at high wind speeds in particular the risk of flow separation on the pressure side of the profiles of the rotor blades 108 in the outer region of the rotor blade 108. Such flow separations result amongst other things in severe wind noises and in aeroelastic instabilities and high loads. The sensitivity for this problem, which is dependent in particular on wind speed, varies across various types of wind power installations 100 and rotor blades 108.

The method 300 now enables individual installation control at different power levels while observing the boundary condition of separation-free profile flow around the rotor blade. In addition, while observing this boundary condition, a tariff-optimized operation can be carried out, for example when different wind power installations 100 obtain different infeed tariffs.

For this purpose, the method 300 initially comprises a step 310 of obtaining a setpoint power value of the wind farm 112, in particular a setpoint value of the electrical power of the wind farm 112 that is to be fed in. The setpoint power value is provided, for example, by the network operator of the electrical supply network and may require a power limitation of the wind farm or at least some of the wind power installations 100 given sufficient available wind power.

In a step 320, for this purpose an actual power value of the wind farm 112 is ascertained as the sum of actual electrical powers of the operated wind power installations 100. If the actual power value exceeds the setpoint power value, the farm controller 122 has to intervene and bring about a power limitation in order that the setpoint power value is observed as maximum value. If the actual power value is below the setpoint power value, the farm controller 122 can preferably ensure that each of the wind power installations 100 is operated in a power-optimized operating mode, provided this is not excluded by other additional conditions such as sound generation. The farm controller 122 thus attempts to generate as much active electrical power as possible in order to reach the setpoint power value, wherein this reaching of the setpoint power value is dependent on the wind speed.

The method now relates in a step 330 to checking whether a power-reduced operation of one of the wind power installations is fundamentally necessary. If not, no limitation of a wind power installation 100 is necessary and each of the wind power installations 100 can be operated in the power-optimized operating mode in a step 335.

If a limitation, that is to say a power-reduced operation, of at least one of the wind power installations 100 is necessary, in a further step 340 a permissibility of a power-reduced operating mode of each of the wind power installations 100 of the wind farm is determined on the basis of an associated aerodynamic characteristic value. The aerodynamic characteristic value is preferably formed as a characteristic map and a function of a plurality of input variables, for example a rotational speed of the wind power insulation 100, a power stage and/or a degree of soiling of the rotor. An aerodynamic characteristic value that indicates whether or not flow separation on the pressure side occurs during operation in the operating mode to be checked under the current wind conditions can then be obtained on the basis of the prevailing wind speed.

An operating mode is fundamentally permissible when the aerodynamic characteristic value for the current wind conditions indicates that no flow separation occurs.

The aerodynamic characteristic value can be tabulated or available in the central farm controller 122 or it can be available on the individual wind power installations 100 that then independently determine the permissibility of an operating mode.

In this step 340, the permissibility of only one determined, desired operating mode can be determined. For example, the central farm controller 122 can determine a permissibility of an operating mode with a determined power limitation. As an alternative, a plurality of different permissibilities of operating modes can also be determined in step 340. For example, the permissibility can be determined using the aerodynamic characteristic value for various stages of the power limitation.

The permissibility of all of the operating modes particularly advantageously does not have to be checked at all times but the check is limited to operating modes that may potentially arise. As a result, the demand for computation power, for example by the central farm controller 122, can be kept low and the processing time until the result of step 340 is available can be reduced.

In a particularly preferred example, the aerodynamic characteristic value is a critical pitch angle that may not be exceeded under the given conditions for a determined operating mode in order that said operating mode is determined as permissible.

Finally, using the permissibilities determined in step 340, the wind power installations 100 are operated, that is to say the operating modes of the wind power installations 100 are set, in a step 350 in such a way that each of the operated wind power installations 100 is operated in a permissible operating mode and the ascertained actual power value does not exceed the obtained setpoint power value.

Here, depending on the case, at least one of the wind power installations 100 of the wind farm is not operated in order that at least one of the remaining wind power installations 100 is able to be operated in a permissible operating mode. This is relevant in particular for severely limited scenarios and/or high wind speeds.

The selection of the respective operating mode from a plurality of permissible operating modes can be made in particular according to a) tariff, b) load and/or c) sound.

Several operating scenarios are thus advantageously able to be achieved.

At low wind speeds, wind power installations 100 in the wind farm run in power-reduced operation, for example with a reduced rotational speed. If the wind speed increases, successive wind power installations 100, depending on installation type, run in a critical operating state. In this scenario, the critical operation can be shifted to higher wind speeds by increasing the rotational speed from a critical wind speed. This is achieved by determining the permissible operating modes.

At high wind speeds, the wind power installations 100 run, for example, in a power-optimized operation at full load. If a power limitation is now required, wind power installations 100, depending on installation type and demanded power level, can run in a critical operating state. In this scenario, the nominal rotational speed is preferably retained in the case of power reduction. A critical operation is accordingly shifted to smaller power stages and/or higher wind speeds.

The determination of the permissible operating modes can thus permit an operation at reduced rotational speed up to storm control mode that is applied at a wind speed that exceeds a threshold value since no negative stall occurs during operation. In comparison with previously known control modes, the rotational speed is preferably increased from a predetermined wind speed up to the storm control mode. As an alternative, the rotational speed is initially increased, which is then followed by a decrease in the rotational speed to a non-critical value for the occurrence of negative stall in the case of further increasing wind speed.

In summary, the power reduction at high wind speeds in wind farms 112 must thus take into account aerodynamic boundary conditions. For this purpose, the solution proposed is, for example, an increase to or a retaining of the nominal rotational speed for shifting critical operating points to higher wind speeds or smaller power stages.

As an alternative, the combination of the described method with a controllable aerodynamic brake in the inner rotor region and/or with energy storage solutions is conceivable. The controllable aerodynamic brake may comprise, for example, flaps or similar movable add-on parts. Both additional concepts expand the field of use of the wind farm 112 or the range of permissible operating modes of the individual wind power installations 100.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for operating a wind farm having a plurality of wind power installations,
   wherein each wind power installation of the plurality of wind power installations includes an aerodynamic rotor having a respective aerodynamic characteristic value, and
   wherein the method comprises:
      obtaining a setpoint power value of the wind farm, the setpoint power value being a setpoint value of electrical power that is to be fed into an electric supply network;
      determining an actual power value of the wind farm as a sum of actual electrical powers of a plurality of operated wind power installations;
      determining a permissibility of a power-reduced operating mode of each wind power installation of the plurality of wind power installations of the wind farm based on the respective aerodynamic characteristic value; and
      operating the plurality of wind power installations of the wind farm such that each operated wind power installation is operated in a permissible operating mode and the actual power value does not exceed the setpoint power value,
      wherein the aerodynamic characteristic value is determined based on a characteristic map, wherein the characteristic map indicates the aerodynamic characteristic value as a function of a rotational speed of the wind power installation and a power stage, and
      wherein the characteristic map indicates the aerodynamic characteristic value as a function of the rotational speed of the wind power installation and the power stage and a degree of soiling of the rotor.

2. The method according to claim 1, comprising:
   determining, based on the setpoint power value, whether to operate at least one of the plurality of wind power installations in power-reduced operation.

3. The method according to claim 1, wherein at least one of the plurality of wind power installations of the wind farm is not operated such that at least one of remaining wind power installation of the plurality of wind power installations is operated in the permissible operating mode.

4. The method according to claim 1, wherein the aerodynamic characteristic value indicates a flow separation.

5. The method according to claim 4, wherein the aerodynamic characteristic value indicates the flow separation on a pressure side of the rotor blade of the rotor.

6. The method according to claim 4, wherein the aerodynamic characteristic value includes a critical pitch angle, wherein the flow separation occurs when the critical pitch angle is exceeded.

7. The method according to claim 1, wherein each of the plurality of wind power installations is operated within a permissible area of the characteristic map.

8. The method according to claim 1, wherein an operating mode is selected from permissible operating modes of individual installations based on the basis of at least one of:
   tariff,
   load, or
   sound.

9. The method according to claim 1, wherein the aerodynamic characteristic value is determined individually for each of the plurality wind power installations.

10. The method according to claim 1, wherein determining the permissibility of the power-reduced operating mode of each of the plurality of wind power installations includes:
    determining a setpoint rotational speed of the aerodynamic rotor based on the aerodynamic characteristic value.

11. The method according to claim 10, wherein operating the wind power installation in the power-reduced operating mode includes reducing the setpoint rotational speed in a first operating range and increasing the setpoint rotational speed in a second operating range.

12. The method according to claim 1, wherein operating the wind power installation in the power-reduced operating mode includes changing a pitch angle of the rotor.

13. The method according to claim 1, wherein operating the wind power installation in the power-reduced operating mode includes reducing a pitch angle of the rotor.

14. The method according to claim 1, wherein the aerodynamic rotor is coupled to an electrical generator and operating the wind power installation in the power-reduced operating mode includes changing a generator torque of the electrical generator.

15. The method according to claim 14, wherein active electrical power at an output of the electrical generator in the power-reduced operating mode is reduced to a predetermined power value and/or by a predetermined absolute power value.

16. The method according to claim 15, wherein at least one of aerodynamic characteristic values is used in determining at least one setpoint rotational speed of one of aerodynamic rotors of the plurality of wind power installations.

17. A wind farm, comprising:
    a plurality of wind power installations; and
    a wind farm controller configured to:
       obtain a setpoint power value of the wind farm, the setpoint power value being a setpoint value of electrical power that is to be fed into an electric supply network;
       determine an actual power value of the wind farm as a sum of actual electrical powers of a plurality of operated wind power installations;
       determine a permissibility of a power-reduced operating mode of each wind power installation of the plurality of wind power installations based on a respective aerodynamic characteristic value of an aerodynamic rotor of the wind power installation, wherein the aerodynamic characteristic value characterizes at least one aerodynamic property of a rotor blade, wherein the aerodynamic characteristic value does not substantially change over a lifetime of the wind power installation; and
       operate the plurality of wind power installations of the wind farm such that each operated wind power installation is operated in a permissible operating mode and the actual power value does not exceed the setpoint power value,
       wherein the aerodynamic characteristic value is determined based on a characteristic map, wherein the characteristic map indicates the aerodynamic characteristic value as a function of a rotational speed of the wind power installation and a power stage, and wherein the characteristic map indicates the aerodynamic characteristic value as a function of the rotational speed of the wind power installation and the power stage and a degree of soiling of the rotor.

* * * * *